No. 617,709.  
J. M. BARRETT.  
NECKTIE HOLDER.  
(Application filed June 7, 1897.)  
Patented Jan. 17, 1899.
(No Model.)
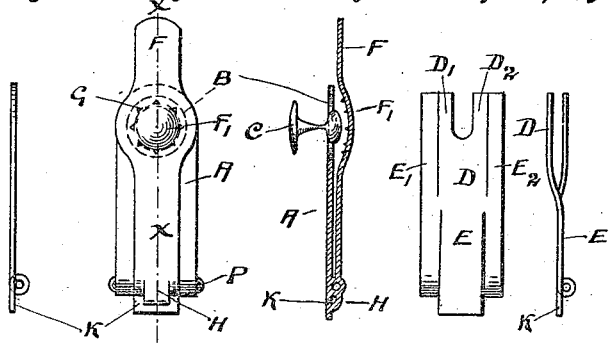
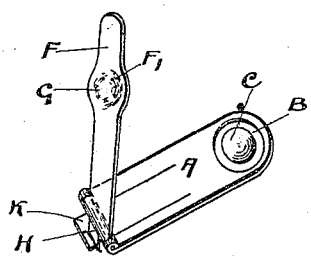
Witnesses:  
Charles W Brower  
Axel V Beeken
Inventor:  
James Marsh Barrett  
By his Attorney  
August M. Treschow

UNITED STATES PATENT OFFICE.

JAMES MARSH BARRETT, OF BLOOMFIELD, NEW JERSEY.

NECKTIE-HOLDER.

SPECIFICATION forming part of Letters Patent No. 617,709, dated January 17, 1899.

Application filed June 7, 1897. Serial No. 639,697. (No model.)

*To all whom it may concern:*

Be it known that I, JAMES MARSH BARRETT, a citizen of the United States, residing at Bloomfield, in the county of Essex and State of New Jersey, have invented certain new and useful Improvements in Necktie-Holders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a device adapted for the purpose of securing the necktie in its proper place around the collar and prevent it from either slipping sidewise or up and down; in fact, keeping it in as natural a position as possible. It will, furthermore, permit the necktie being tied and adjusted before performing its function of keeping it in its place, and, lastly, it will admit of the use of any width of necktie.

In describing my invention I will call attention to the accompanying drawings, where like letters of reference indicate corresponding parts in the different views.

Figure 2 shows a plan view of my necktie-holder; Fig. 1, a side view of the part attachable to the shirt-button; Fig. 3, a side view of Fig. 2, cut through according to a line $x\ x$ on Fig 2; Fig. 4, the part attachable to the button with a catch constructed to secure it to the collar and having a fork-like projection supporting it around the collar-button. Fig. 5 is a side view of Fig. 4, and Fig. 6 is a perspective view of Fig. 2.

A indicates the part that fits around the collar-button, and can have, as shown in Figs. 2, 3, and 6, a hole B, through which the collar-button C protrudes, or it can be forked, as in Fig. 4, where the part D, having the prongs D' and D², lies around the collar-button and under the collar, while the main body E, with the prongs E' and E², lies outside of the collar, the collar thus being clasped between D' and D² and E' and E². Various other methods can also be used to attach my device around the collar-button without departing from the spirit of my invention.

F represents the outer part of my device, which, aided by a spring movement created by the action of the said outer part F upon the inner part A, secures the necktie in its place. In order to secure it firmly there, said part F is slightly hollowed out at F', so as to fit more snugly over the button and not be raised too much above the collar, and to better hold the necktie and aid the spring action said part F' is furnished with small-pointed prolongations lying in a circle, as at G. The spring action can be created in various ways, and looked upon as a spring action pure and simple is, in fact, no part of my inventive idea, the one that takes up least space and has by me been found most practical being shown in the hereto-attached drawings. This spring action consists in part F, having a projection H, that is bent according to a right angle, said projection H resting on a tongue K, cut out in the lower part A, that is attached to the collar-button. As a consequence it will be seen that as the two parts A and F, secured to each other by the pin P, have a hinge movement the part F will force back the tongue K and be recipient of a reacting movement, and it will further be seen that F can be bent backward till it lies in a prolongation of part A, and will thus permit the wearer of the necktie to adjust the tie to his satisfaction, after which F is bent over again toward the collar-button and pressed down over same, performing thus the function claimed for it, and being easily adjustable, which was the object I had in view.

What I claim as an improved necktie-holder is—

A necktie-fastener consisting of an inner and an outer plate united by a spring-hinge, the outer plate having a depression in its inner surface the surface of which depression is roughened or spiked, and the inner plate having a hole opposite the depression for receiving the collar-button, whereby necktie-bands wider than the fastener may be secured to the collar-button, substantially as described.

In testimony that I claim the foregoing I have hereunto set my hand this 3d day of June, 1897.

JAMES MARSH BARRETT.

Witnesses:
ALFRED B. VAN LIEW,
AUG. M. TRESCHOW.